United States Patent
Marco et al.

(10) Patent No.: US 10,253,898 B2
(45) Date of Patent: Apr. 9, 2019

(54) PRESSURE MEASURING SYSTEM WITH SELF-CLOSING THROTTLE

(71) Applicant: WIKA Alexander Wiegand SE & Co. KG, Klingenberg (DE)

(72) Inventors: Mirko Di Marco, Kleinwallstadt (DE); Michael Hertwig, Eschau (DE); Ismail Guezel, Obernburg (DE)

(73) Assignee: WIKA Alexander Wiegand SE & Co. KG, Klingenberg (DE)

( * ) Notice: Subject to any disclaimer, the term of this patent is extended or adjusted under 35 U.S.C. 154(b) by 119 days.

(21) Appl. No.: 15/353,756

(22) Filed: Nov. 17, 2016

(65) Prior Publication Data
US 2017/0138495 A1 May 18, 2017

(30) Foreign Application Priority Data
Nov. 17, 2015 (DE) .......................... 10 2015 014 718

(51) Int. Cl.
| | | |
|---|---|---|
| F16K 17/00 | (2006.01) | |
| F16K 17/20 | (2006.01) | |
| F16K 17/36 | (2006.01) | |
| F16K 17/28 | (2006.01) | |
| G01F 1/00 | (2006.01) | |

(52) U.S. Cl.
CPC ............ *F16K 17/20* (2013.01); *F16K 17/285* (2013.01); *F16K 17/36* (2013.01); *F16K 17/366* (2013.01); *G01F 1/00* (2013.01); *Y10T 137/7728* (2015.04)

(58) Field of Classification Search
CPC ...... F16K 17/20; F16K 17/366; F16K 17/285; F16K 17/36; G01F 1/00
USPC ...... 137/470, 461, 471; 73/1.71, 12.08, 741, 73/743
See application file for complete search history.

(56) References Cited

U.S. PATENT DOCUMENTS

| | | | | |
|---|---|---|---|---|
| 2,186,872 A | * | 1/1940 | Klein ...................... | G01L 7/041 73/710 |
| 3,457,949 A | * | 7/1969 | Coulter ................. | F16K 15/026 137/516.27 |
| 4,727,903 A | * | 3/1988 | Sturgis .................... | F16K 17/30 137/461 |

* cited by examiner

*Primary Examiner* — Umashankar Venkatesan
(74) *Attorney, Agent, or Firm* — Muncy, Geissler, Olds & Lowe, P.C.

(57) ABSTRACT

A pressure measuring system is provided in which a closing element supported in the pressure fitting channel is activated or displaced by a pressure surge or a pressure wave and thereby seals the channel to the measuring element and thus prevents an outflow of the fluid.

16 Claims, 8 Drawing Sheets

PRESSURE MEASURING SYSTEM WITH SELF-CLOSING THROTTLE

This nonprovisional application claims priority under 35 U.S.C. § 119(a) to German Patent Application No. 10 2015 014 718.8, which was filed in Germany on Nov. 17, 2015, and which is herein incorporated by reference.

BACKGROUND OF THE INVENTION

Field of the Invention

The invention relates to a pressure measuring system having a pressure channel, which is self-closing in critical situations and thus protects the measuring system.

Description of the Background Art

Pressure measuring systems are known, however, in an event of overpressure or pressure surges or bulk waves, the pressure measuring systems are prone to rupturing or blow-off.

SUMMARY OF THE INVENTION

An object of the invention is to provide a cost-effective approach for a pressure measuring system which prevents rupturing or blow-off in the case of overpressure or pressure surges or bulk waves. The pressure measuring system may be a manometer or a Bourdon tube or also an electronic pressure sensor having a piezoelectric sensor, a thin-film sensor or a ceramic pressure measuring cell.

The closing element according to an exemplary embodiment of the invention, synonymous with a throttle, is for measuring instruments on acetylene compressed gas cylinders. In this case, for example, a manometer is installed in the assembly with a pressure controller or valve.

In the unfavorable event that the pressure cylinder overheats, e.g. in the case of fire, or the manometer is damaged by unfavorably falling over, precautions should be taken which prevent leakage and thus a blow-off of the cylinder (e.g., compressed gas cylinder). Such precautions include a closing element having a self-closing function.

Since acetylene is a gas with a high potential for danger, and cases are known, in which a cylinder has changed to a critical state even after cooling and waiting periods, an overpressure state should optionally also be indicated separately to a user. The indicated overpressure state will warn the user. A function of this type is described in the independent claims.

However, the closing element according to the invention is not only suitable for acetylene compressed gas cylinders but also for all other flammable and inflammable pressurized systems which comprise gases, such as pipeline systems and compressed gas cylinders and other technical storage types.

According to an exemplary embodiment the invention, the pressure measuring system includes a device comprising a closing element, which is activated and closes a pressure channel in the case of an undesirable or unscheduled pressure increase. In particular, approaches are demonstrated in certain designs, which continuously display an activation and thus alert the user to a special pressure situation in progress or an endangerment due to a pressure change that has occurred in the past.

In an exemplary embodiment, a pressure measuring system is provided that includes a pressure fitting, a measuring element and an evaluation or signal transmitter. The measuring element is connected pressure-tight to the pressure fitting, and the pressure fitting has a pressure channel internally, in particular including different areas of the channel, which is connected pressure-tight to the measuring element. Also, a movable closing element is introduced into the pressure channel, which seals the pressure channel if the pressure or volume increases.

The movable closing element can seal the pressure channel with the aid of an intermittent pressure volume flow in the case of a pressure increase and/or volume increase, including a sudden or intermittent pressure increase or volume increase.

The movable closing element can seal the pressure channel in the case of a pressure increase and/or volume increase if i) a sudden or intermittent pressure increase comprises a) a pressure gradient of 2 to 150 bar/minute, in particular 2 to 50 bar/minute, preferably 5 to 50 bar/minute, or b) comprises a pressure gradient of a multiple of 10 bar/second, in particular 2 to 50 bar/second, or ii) a pressure increase to greater than or equal to 350 bar, in particular from 350 to 450 bar, results in a rupture of the measuring system and the escape of a fluid. The movable closing element will seal the pressure channel due to the subsequent increase in the volume of the escaping fluid in the channel.

According to an embodiment, the closing element may a) be designed as at least one molded body, in particular as a sphere, a cylindrical molded body, a hollow cylinder, a sleeve, a sleeve closed on one side or a piston, or b) the closing element may be present in a two-part arrangement, which includes i) a hollow, piston-shaped body and a closing element disposed in the body, in particular a movable molded body, preferably a sphere or a deformable molded body, or ii) a movable molded body as a closing element and a holder.

According to an embodiment, the closing element may be a deformable molded body, in particular made from an elastic material such as rubber or silicone. The molded body may be designed as an elastic injection-molded part.

The closing element may be a sleeve which can be closed on one side, and/or a cylindrical molded body. The closing element can have at least one circumferential seal on its outer circumference.

Figures 5A, 5B, 5C, 6:
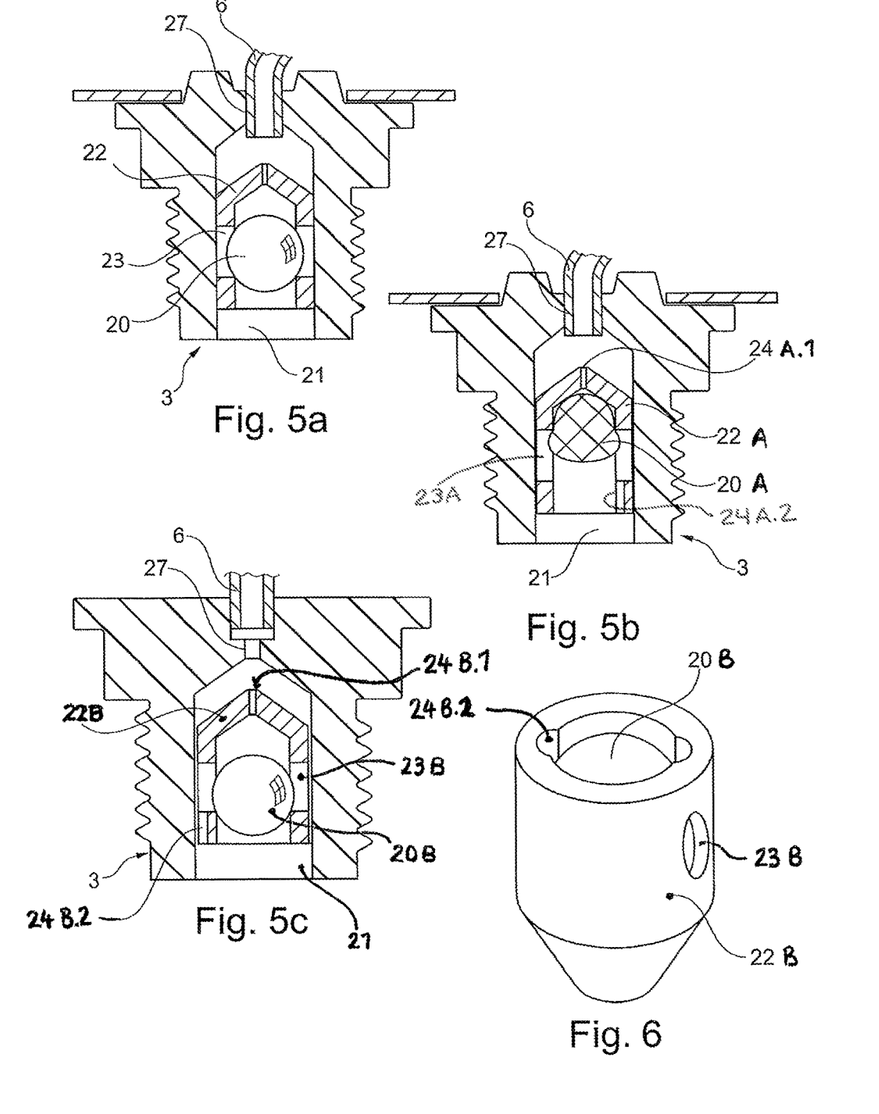
FIG. 5a shows a pressure fitting.
FIG. 5b shows a closing element.
FIG. 5c shows a throttle.
FIG. 6 shows a spherical closing element in a guide part.

In a two-part arrangement comprising a hollow, piston-shaped body as the guide part and a closing element disposed in the body, such as a sphere or a deformable molded body, the hollow, piston-shaped body preferably includes a seal and a holding zone. The seal is preferably provided in an area above a possible holding zone. In addition, the hollow body may have a holding zone which may be preferably formed by providing two diametrically opposed openings in the outer circumference of the hollow body, in which, for example, a spherical closing element may come to rest, as illustrated in FIGS. 5a and 5c. The hollow body may furthermore have at least one through-channel, which is preferably disposed on the upper end of the body forming the guide part. The hollow, piston-shaped body may optionally have at least one additional through-channel on its lower inner and/or outer circumference.

To ensure fluid communication, the pressure fitting may have at least one free space, groove or through-channel internally in the pressure fitting channel.

According to an embodiment of the invention, the closing element may be brought from a setpoint position (X) into a sealing position (Y) in the pressure channel by a first lift H1, with the aid of a pressure surge or a pressure wave in the pressure channel. Starting from this first lift, the pressure channel is closed. If the pressure increases to the extent that a second lift also takes place from sealing position Y into warning position Z, a warning signal is displayed on the pressure measuring system.

Alternatively, the closing element having a circumferential seal may be brought from a setpoint position X into a sealing position Y within a guide part, due to a pressure surge or a bulk wave, and then close the pressure channel to the measuring element pressure-tight. The guide part can be fixed in the channel (see, e.g., FIG. 5), or the guide part can be movable in the channel (see, e.g., FIG. 9).

Furthermore, the closing element may traverse a volume section of the pressure fitting, due to a pressure surge or a bulk wave, and compress a defined volume into the inner volume of the measuring element and/or the pressure channel and close the pressure channel pressure-tight. It is also preferred if a defined volume is compressed into the inner volume of the measuring element and/or the pressure channel, and if a defined pressure sets in due to the defined volume displacement, which is indicated as an overpressure, a warning indication is included on the evaluation display. It is furthermore preferred if the warning message activated by the pressure surge or the bulk wave is continuously displayed as an evaluation of the pressure increase on the display or dial. This continuous display may be technically implemented by the fact that the pointer is caught and/or held in a warning position with the aid of means which are preferably formed from ramps or stops.

The use of a pressure measuring system i) in pressure systems such as pipeline systems or ii) on compressed gas cylinders (e.g., compressed gas cylinders which are filled with a welding gas, preferably an acetylene-containing gas or gas mixture), is also the subject matter of the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
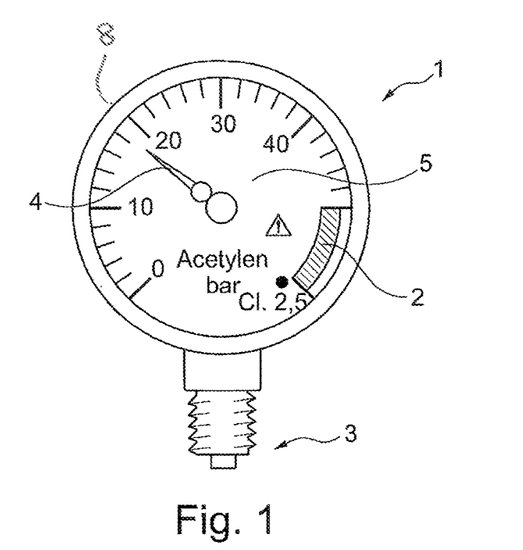
FIG. 1 shows a manometer.

FIG. 1 shows a manometer 1 as the pressure measuring system, including a measuring element 8 which comprises a warning area 2 upon reaching impermissible overpressure or a pressure range representing an endangerment.

Figure 13:
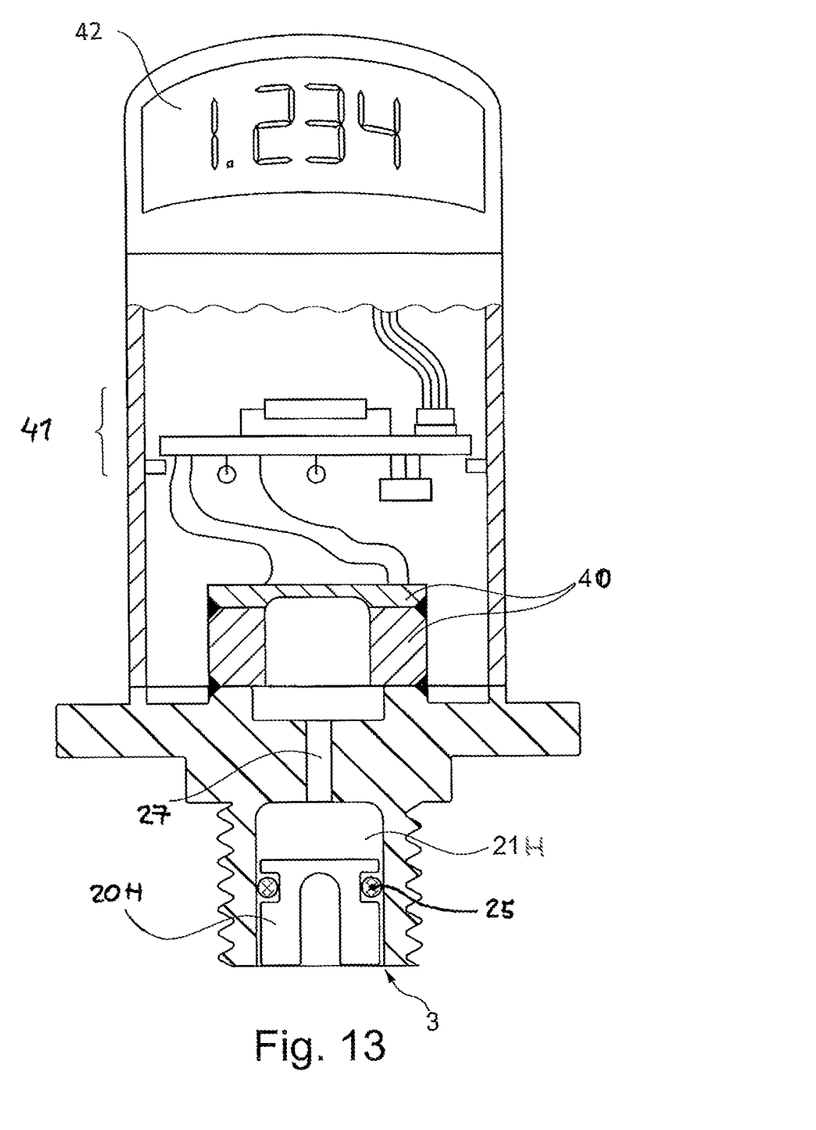
FIG. 13 shows a closing element in the form of a piston.

An evaluation of the pressure at pressure fitting 3 may be implemented within the pressure measuring system gearlessly, with the aid of a transmission mechanism or electronically, e.g., with a pointer 4 on a dial 5 (FIG. 1) or a digital display 42 (FIG. 13).

Figure 2:
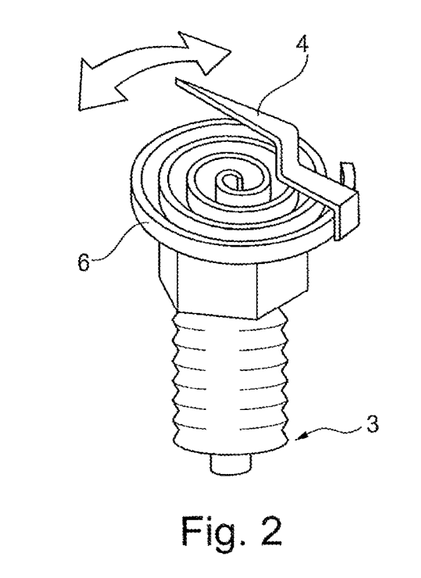
FIG. 2 shows a shows gearless manometer.

FIG. 2 shows gearless manometer 1, in which the change in pressure or evaluation of the change in pressure is implemented by the pointer 4. The pointer 4 is connected directly to a part or end of spiral Bourdon tube 6 (measuring tube). Measuring tube 6 is connected pressure-tight to pressure fitting 3.

Figure 3:
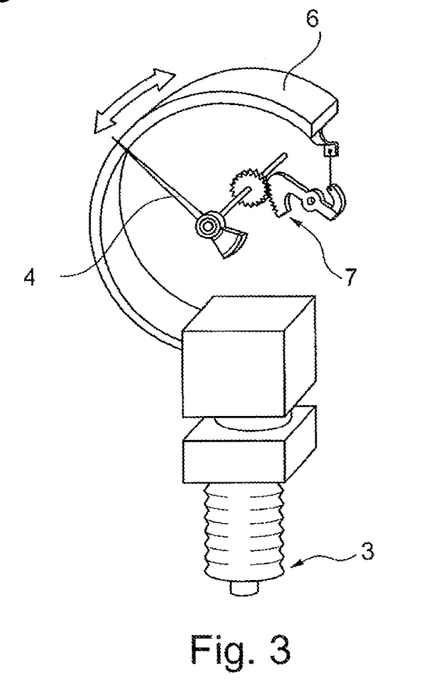
FIG. 3 shows a schematic view of a manometer.

FIG. 3 shows a schematic view of a manometer 1, in which a displacement of measuring tube 6 drives pointer 4 via a movement 7.

Figure 4:
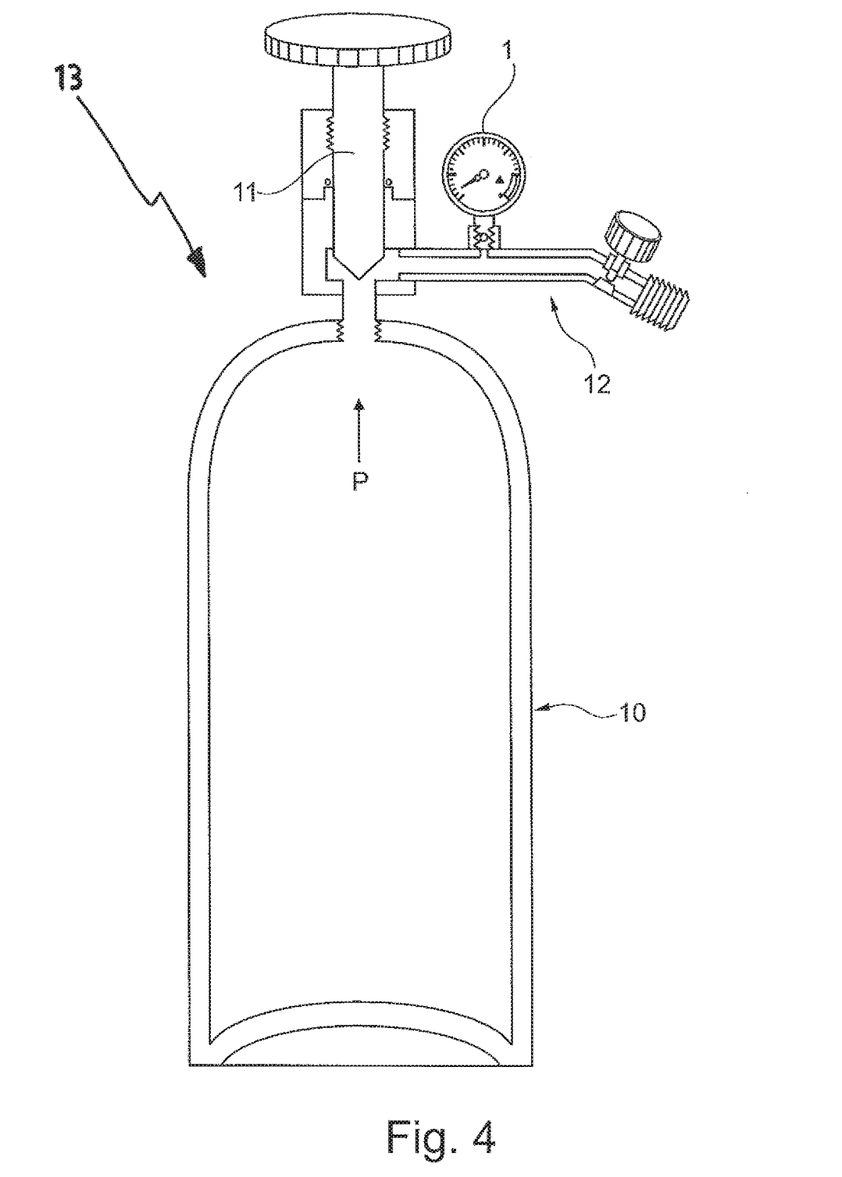
FIG. 4 shows an arrangement of a compressed gas cylinder including a pressure measuring system.

FIG. 4 shows an arrangement 13 of a compressed gas cylinder 10 including manometer 1. Compressed gas cylinder 10 includes a main valve 11 and a bleed unit 12 having the manometer 1. The arrangement is illustrated in simplified form in FIG. 4, without a pressure reducer or pressure controller.

FIG. 5A shows a pressure fitting 3, including a measuring tube 6 and a measuring channel 27, having a spherical closing element 20 in a guide part 22 fixed in a channel bore 21 (pressure fitting channel). The guide part 22 is pressed into pressure fitting channel 21 of pressure fitting 3, but may have a different design. The closing element 20 is preferably made from a deformable material such as rubber and is held in an exposed holding zone 23.

FIG. 5B also shows a closing element, which comprises a throttle in the form of a sleeve-like guide part 22A having a defined through-channel 24A.1 and an originally spherical closing element (20A) in the form of a deformable molded body 20A, which is movably supported in a holding zone 23A. The sleeve-like guide part 22A and the closing element 20A are integrated into the pressure fitting channel 21. The sleeve-like guide part 22A may be fixedly pressed in the pressure-fitting channel 21. If a pressure surge occurs, including a sudden pressure increase, closing element 20A may be lifted up and deformed as shown to seal through-channel 24A.1. The through-channel 24A.1 forms an upper through-channel and the sleeve-like guide part 22A also has a lower through-channel 24A.2 below closing element 20A.

FIG. 5C shows a throttle (closing element), which comprises a guide part 22B having holding zone 23B and a spherical closing element 20B, similar to FIG. 5A, which may be integrated into pressure fitting channel 21 of pressure channel connecting piece 3 of a manometer 1 or a pressure sensor. The guide part 22B has a lower through-slot/channel 24B.2 for a fluid in the lower area on the outside of sleeve-like guide part 22B. Guide part 22B also has an upper through channel 24B.1.

FIG. 6 shows spherical closing element 20B in a guide part 22B, including holding zone 23B and lower through-channel 24B.2 from FIG. 5 in a spatial representation.

Figure 7:
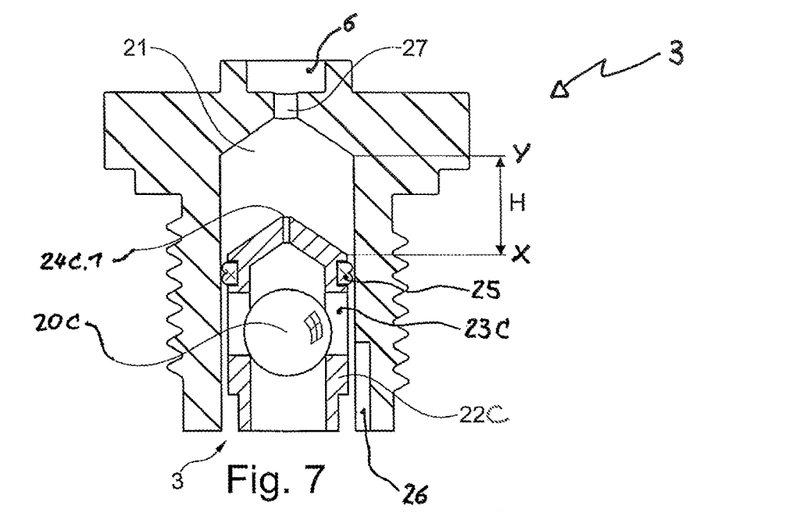
FIG. 7 shows a pressure fitting including measuring tube and measuring channel.

FIG. 7 illustrates a pressure fitting 3 including measuring tube 6, measuring channel 27, pressure fitting channel 21, and a spherical closing element 20C disposed in a guide part 22C having a seal 25, i.e., a sealing ring. The closing element 20C may seal through-channel 24C.1 in a clamping manner by being lifted out of setpoint position X into sealing position Y. In the case of a greater pressure wave, however, guide part 22C may also execute a lift H and displace a volume defined with the aid of H upward into measuring element 8 (not illustrated), in particular into warning position Z, and it may thus fix pointer 4 from FIG. 1 in an overpressure range. The overpressure range may then be displayed as the warning position. Pressure fitting 3 has a free space or through channel 26 on the inside in the pressure fitting channel 21 that connects with holding zone 23C and through channel 24C.1 to establish the fluid communication with measuring channel 27. A sealing ring 25 supports guide part 22C in pressure fitting channel 21, forming a seal.

Figure 8A:
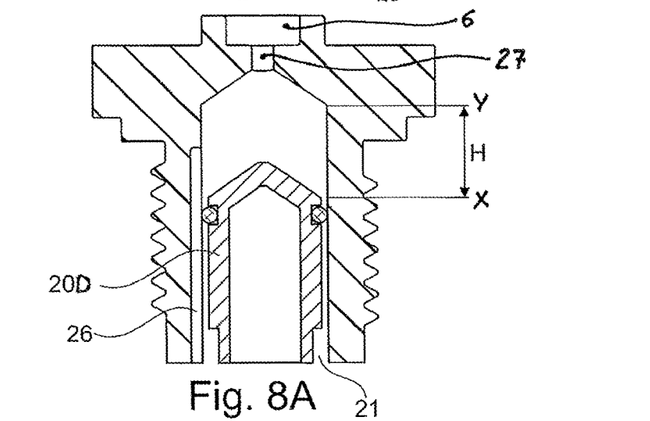
FIGS. 8a and 8b show a closing element in the form of a modified guide part.
Figure 8B:
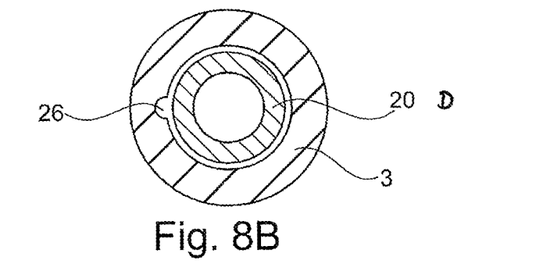

FIGS. 8A and 8B also show a closing element 20D in the form of a modified guide part and pressure fitting channel 21 has a through channel 26 or a free space 26 on the side for the purpose of facilitating a fluid communication to measuring tube 6 under normal measuring pressure. In the event of a pressure surge or a pressure wave, guide part 20D may be lifted, in particular by lift H, out of setpoint position X into sealing position Y, and may thus seal measuring channel 27.

Figure 9:
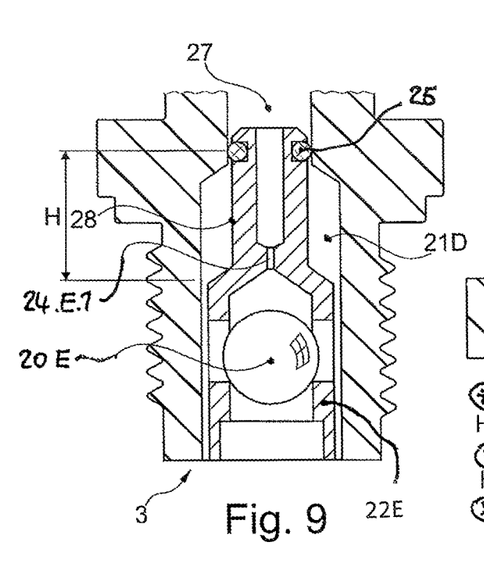
FIG. 9 shows a closing element, comprising a spherical molded body.

FIG. 9 shows a closing element 20E, comprising a spherical molded body 20E, similar to FIG. 7, in a guide part 22E. From setpoint position X, the guide part 22E is able to execute a lift H for the purpose of closing upper through-channel 24E.1 and thus also pressure channel 27, synonymous with measuring channel, to the measuring element (sealing position Y). The guide part 22E includes sealing ring 25. A defined volume of hollow upper area 28 of guide part 22E is displaced from the lift, upward into measuring element 8, which is not illustrated, and thus fixes the pointer from FIG. 1, 14 or 15 in an overpressure range. In this position, guide part 22E is in warning position Z.

A groove or through-channel in the inner circumference of pressure channel 21 of pressure fitting 3 establishes a fluid communication to the sensor or measuring element in the normal state. Guide part 22E is held, in particular, in an idle position by its compressed sealing ring 25, and the guide part in the form of a piston 22E is displaced only by a pressure/volume surge in the direction of the sensor for the purpose of completely sealing pressure channel 21E/27E, a defined and calculated "slip-stick" effect of sealing rings 25 being helpful to avoid false activation, e.g., in the event of shocks.

Figure 10:
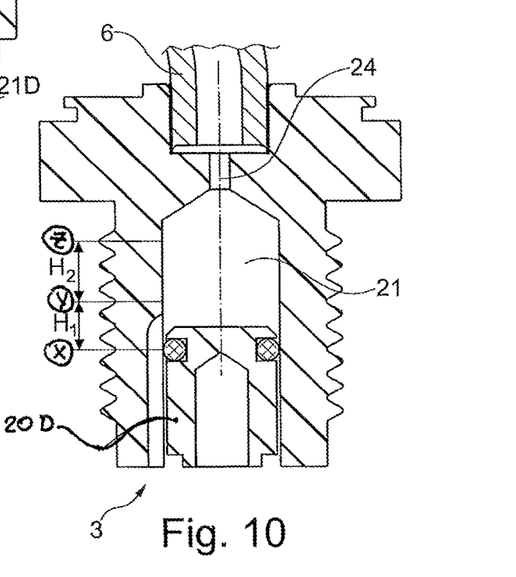
FIG. 10 shows a closing element in the form of a guide part.

FIG. 10 shows a closing element 20D, similar to FIG. 8, in the form of a guide part, which is brought by a first lift H1 from setpoint position X into sealing position Y, and closes pressure fitting channel 21. A second lift H2 may guide the guide part from sealing position Y into warning position Z, in that a defined volume element is displaced into the measuring element. In addition, a defined volume is displaced upward by second lift H2 into measuring element 8 (not illustrated), thus fixing pointer from FIG. 1, 14 or 15 in an overpressure range.

Figure 11:
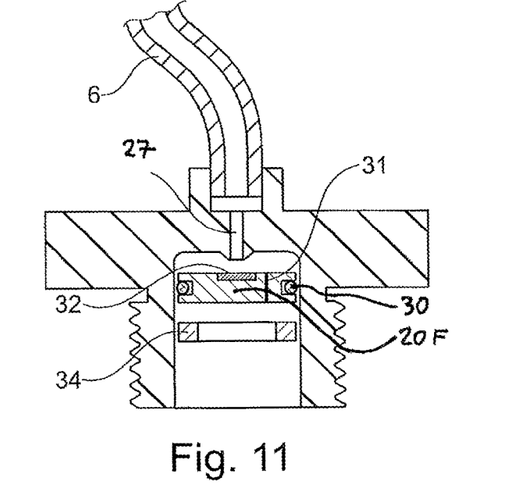
FIG. 11 shows a two-part throttle arrangement of a closing element.

FIG. 11 shows a two-part throttle arrangement of a closing element, comprising a disk-shaped molded body (20F) including a sealing ring 30 as well as a holder 34. The disk-shaped molded body is illustrated as plate 20F, which has a throttle channel 31, and seals measuring channel 27 upwardly via an integrated sealing plate 32, preferably made from a rubber material, upon activation and displacement.

Figure 12:
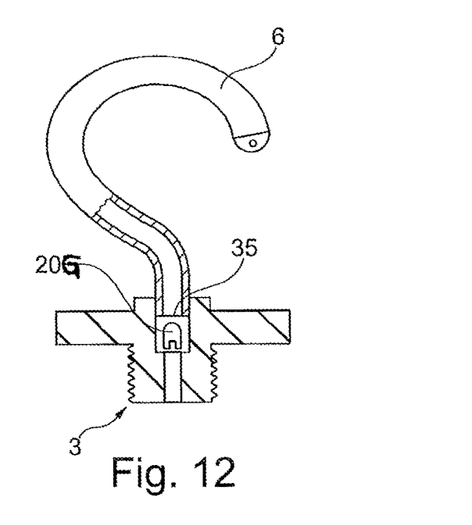
FIG. 12 shows a pressure fitting having a closing element in the form of a stopper.

FIG. 12 shows a pressure fitting 3 having a closing element 20G in the form of a stopper, which is preferably manufactured from a rubber material and which directly seals input 35 of measuring tube 6 in the case of a pressure surge.

FIG. 13 shows a closing element 20H in the form of a piston, including a seal 25, which closes pressure fitting channel 21H against measuring channel 27 to form a seal, similarly to FIG. 10, in the case of a pressure surge and thus protects a pressure sensor 40 against irreversible damage and/or prevents leaks. An impermissible overpressure may be indicated by means of electronic evaluation 41 by the flashing of display 42. The output of "WARNING" or another alarm can be visual and/or audible.

Figure 14:
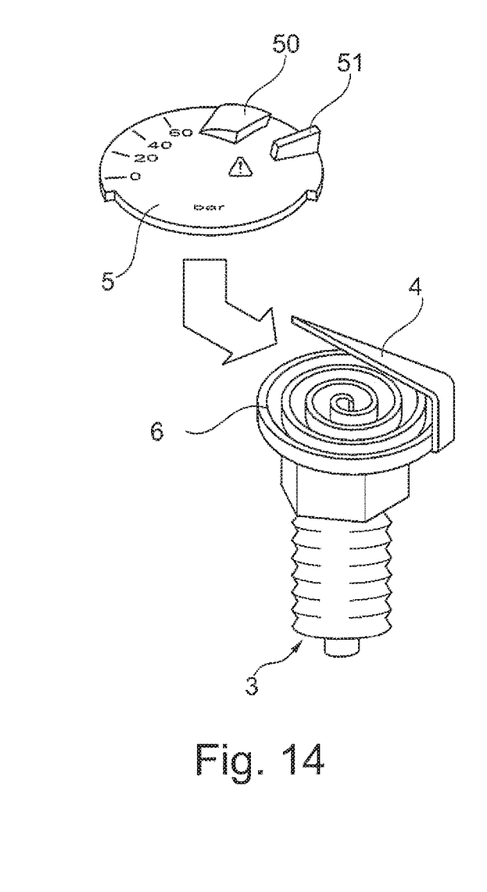
FIG. 14 shows a modified measuring instrument.

FIG. 14 shows a modified measuring instrument, including a pressure fitting 3 from FIG. 2, in which a dial 5, preferably injection-molded from plastic, has a molded-on ramp 50 and stop 51, which is able to gearlessly catch pointer 4 on a measuring tube 6 in an overpressure position and is able to fix it to prevent further forward or backward rotation. A warning state is thus also detectable, when the pressure has already dropped again, while a possible danger still remains.

Figure 15A:
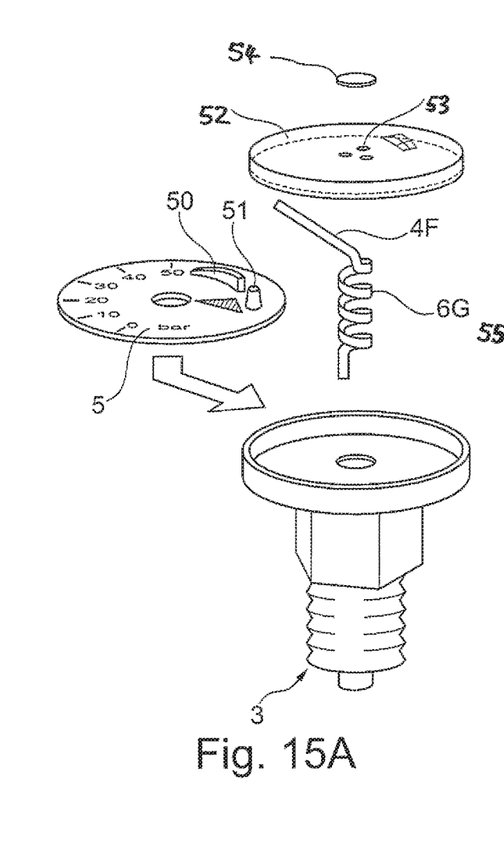
FIG. 15a shows a measuring instrument.

FIG. 15A shows a modified measuring instrument from FIG. 14, in which measuring spring 6G has a helical shape, and in which a dial 5, preferably injection-molded from plastic, also has a molded-on ramp 50 and a stop 51, which is able to gearlessly catch pointer 4 on a measuring tube 6 in an overpressure position and is able to fix it to prevent further forward or backward rotation. A mountable viewing window 52 having blow-out openings 53 is illustrated, which are closed by a cover 54.

FIGS. 1, 14 and 15 show designs which represent a dial which differs from EN 837, since the usual range over 270° is not used as a pressure range indicator and evaluation for the dial. Instead, according to the invention, a smaller partial area is configured only for the pressure display, and a larger partial area is provided with warning symbols or a red or orange or cross-hatched warning area, which signals a critical overpressure state. Thus, the normal display range, for example to 180° or another range, is used in a departure from the standard.

It is simultaneously conceivable that the ramp 50 is also painted red, and special functions for an overpressure are furthermore integrated into the device.

A horn, siren, blinking light or flashing light on or in the housing of the measuring instrument may thus be activated via a light barrier, contact actuator or reed switch with magnetic activation, which is powered from a battery or is powered from the surroundings of the measuring instrument using a buffer store via a photovoltaic cell or another power converter. In addition to light, heat, motion or the fluid itself, e.g. in the case of hydrogen, are also conceivable as the source therefor, if a fuel cell is used.

It is also conceivable that a warning message, which contains the position via satellite and status of the cylinder, is sent to a warning center over a network, by SMS text messaging or via GPRS or according to another radio standard or protocol.

The ramp 50 illustrated in this FIG. 15A, which fixes the pointer in the warning field, is, of course, conceivable in this combination with a dial face, even in another manometer design, for example in FIG. 1.

Figure 15B:
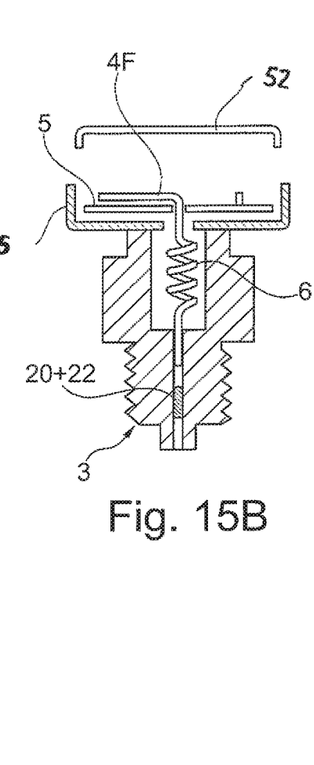
FIG. 15b shows the measuring instrument from FIG. 15A in a sectional view.

FIG. 15B shows the measuring instrument from FIG. 15A in a sectional view, including closing elements (20, 22) in pressure fitting 3 with transparent viewing window 52, disposed on top, which may be mounted on housing 55 with the aid of an engagement mechanism or press fit.

Figure 16:
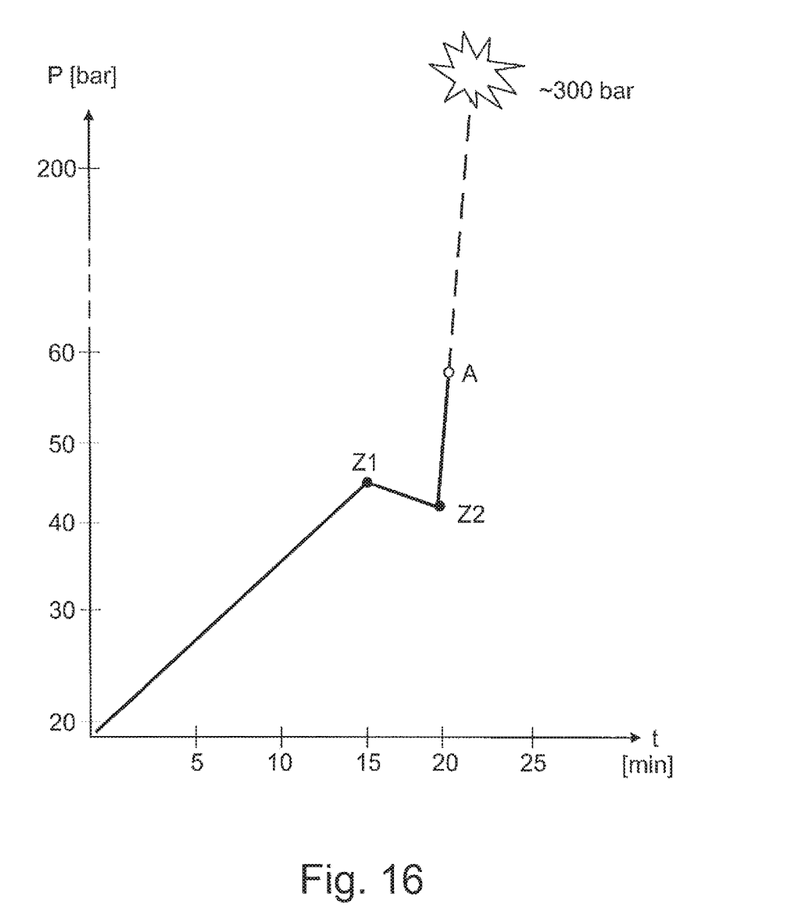
FIG. 16 shows a pressure characteristic curve.

FIG. 16 shows a pressure characteristic in a compressed gas cylinder, e.g., in the case of impermissible heating or after being knocked over, a pressure drop also be able to first take place, e.g. by a cooling, after a period of 15 minutes. During the further progression, the fluid may still react, despite further cooling, and a pressure wave may occur, including an abrupt pressure increase to more than 200 bar, in particular to greater than or equal to 300 bar. At point A of FIG. 16 at the latest, the pressure increases intermittently in the compressed gas cylinder. This may result in the fact that the measuring element is impermissibly inflated, and the measuring element is at risk of rupturing.

During this phase, the pressure increase may rise at a rate of 5 to 50 bar/minute; in extreme cases, it may rise intermittently at rates of 50 to 150 bar/minute or up to 2 to 50 bar/second.

At this point at the latest, the defined response of the illustrated throttle and closing elements sets in and prevents an outflow of fluid and protects the users and staff who work in the rooms or who want to protect the cylinder against dangerous, uncontrollable situations. These persons may include firefighting units who extinguish a fire in a company using, for example, acetylene compressed gas cylinders or users who have inadvertently knocked over the cylinder. A continuous warning display enables necessary security measures to be initiated at an early point.

In principle, however multiple activation mechanisms are possible, two of which are mentioned here:

In the first case, the pressure rises abruptly from a pressure of 40 to 50 bar to a pressure of more than 300 bar. The pressure gradient in this case is a multiple of 10 bar/second or even faster and is viewed as being abrupt or intermittent. The throttle will seal the instrument port as soon as the pressure wave reaches the closing element, e.g. a rubber sphere.

In the second case, it is possible that the pressure rises slowly from the normal fluid pressure of the cylinder to the rupturing pressure of the measuring element. The pressure gradient is a multiple of 10 bar/minute (i.e., comparatively slower than the preceding case). In this case, since volume is first displaced, which sets the closing element in motion for "triggering," the throttle responds only after the measuring element ruptures.

The abrupt pressure difference which is generated when the measuring element ruptures, for example 350 to 450 bar rupture pressure in a gearless pressure measuring instrument as shown, for example in FIG. 14 or 15, may cause a short-term escape of gas. The throttle, however, will immediately "start up" and safely prevent further leaks, because the throttle also abruptly closes the pressure channel.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:
1. A pressure measuring system comprising:
a pressure fitting;
a measuring element connected to the pressure fitting pressure-tight, the pressure fitting having a pressure channel on an inner side, which is connected pressure-tight to the measuring element an evaluation or signal transmitter;
a movable closing element arranged in the pressure channel that seals the pressure channel when the pressure or volume rises; and
a guide part, the guide part being a hollow, piston-shaped body,
wherein the closing element is disposed entirely inside of the hollow, piston-shaped body and the hollow, piston-shaped body is arranged inside of the pressure channel.

2. The pressure measuring system according to claim 1, wherein the closing element is at least one molded body or a sphere.

3. The pressure measuring system according to claim 1, wherein the closing element is a deformable molded body made from rubber, silicone, or an elastic injection-molded part.

4. The pressure measuring system according to claim 1, wherein the closing element is adapted to be brought from a setpoint position into a sealing position in the pressure channel due to a pressure surge or a pressure wave in the pressure channel.

5. The pressure measuring system according to claim 1, wherein the closing element is brought from a setpoint position into a sealing position within the hollow, piston-shaped body due to a pressure surge or a bulk wave and then closes the pressure channel to the measuring element pressure-tight.

6. The pressure measuring system according to claim 1, wherein the closing element traverses a volume section of the pressure fitting due to a pressure surge or a bulk wave and compresses a defined volume into the inner volume of the measuring element and/or the pressure channel and closes the pressure channel pressure-tight.

7. The pressure measuring system according to claim 6, wherein a defined volume is compressed into the inner volume of the measuring element and/or the pressure channel, and wherein a defined pressure sets in due to the defined volume displacement, which is indicated as an overpressure, including a warning indication, on the evaluation display.

8. The pressure measuring system according to claim 1, wherein a warning message is continuously displayed as an evaluation of the pressure increase on a display or a dial due to a pressure surge or bulk wave.

9. The pressure measuring system according to claim 1, wherein the movable closing element seals the pressure channel in the case of a pressure rise, including a sudden or intermittent pressure increase.

10. The pressure measuring system according to claim 1, wherein a sudden or intermittent pressure increase comprises a pressure gradient of 5 to 150 bar/minute, or a pressure gradient of a multiple of 10 bar/second, or a pressure increase to greater than or equal to 350 bar or from 350 to 450 bar, and results in the rupture of the measuring system and the escape of a fluid, and wherein the movable closing element seals the pressure channel due to the resulting increase in the volume of the escaping fluid in the pressure channel.

11. The pressure measuring system according to claim 1, wherein the pressure measuring system measures pressure in pressure systems or on compressed gas cylinders filled with a welding gas, an acetylene-containing gas or gas mixture.

12. The pressure measuring system according to claim 1, wherein the hollow, piston-shaped body has at least one circumferential seal on its outer circumference.

13. The pressure measuring system according to claim 1, wherein an upper end of the hollow, piston-shaped body has an upper through-channel that is aligned with a measuring channel leading to a measuring tube of the measuring element.

14. The pressure measuring system according to claim 4, wherein a side surface of the hollow, piston-shaped body has at least one opening that forms a holding zone that holds the closing element when the closing element is in the setpoint position.

15. The pressure measuring system according to claim 1, wherein the guide part is displaceable within the pressure channel.

16. A pressure measuring system comprising:
- a pressure fitting;
- a measuring element connected to the pressure fitting pressure-tight, the pressure fitting having a pressure channel on an inner side, which is connected pressure-tight to the measuring element
- an evaluation or signal transmitter; and
- a movable closing element arranged in the pressure channel that seals the pressure channel when the pressure or volume rises,
- wherein a warning message is continuously displayed as an evaluation of the pressure increase on a display or a dial due to a pressure surge or bulk wave, and
- wherein the warning indication is continuously displayed on the evaluation display in that the pointer is caught and/or held in a warning position via ramps or stops.

\* \* \* \* \*